(12) United States Patent
Clanton et al.

(10) Patent No.: US 8,367,143 B2
(45) Date of Patent: Feb. 5, 2013

(54) GRANOLA AND GRANOLA PRODUCTS CONTAINING CHOCOLATE AND METHODS OF PREPARATION

(75) Inventors: Gregory A. Clanton, Minnetonka, MN (US); Monica DeCastro, Vineland, NJ (US)

(73) Assignee: General Mills, Inc., Minneapolis, MN (US)

( * ) Notice: Subject to any disclaimer, the term of this patent is extended or adjusted under 35 U.S.C. 154(b) by 268 days.

(21) Appl. No.: 12/618,952

(22) Filed: Nov. 16, 2009

(65) Prior Publication Data

US 2010/0183772 A1    Jul. 22, 2010

Related U.S. Application Data

(60) Provisional application No. 61/146,043, filed on Jan. 21, 2009.

(51) Int. Cl.
*A23L 1/10* (2006.01)
(52) U.S. Cl. .......... 426/618; 426/619; 426/620
(58) Field of Classification Search .......... None
See application file for complete search history.

(56) References Cited

U.S. PATENT DOCUMENTS

| | | | |
|---|---|---|---|
| 6,387,436 B1 | 5/2002 | Mazzoleni et al. | |
| 6,419,970 B1 * | 7/2002 | Willcocks et al. | 426/306 |
| 7,118,772 B2 | 10/2006 | Froseth et al. | |
| 7,169,422 B2 | 1/2007 | Mesu et al. | |
| 2002/0004093 A1 | 1/2002 | Embuscado et al. | |
| 2002/0015759 A1 | 2/2002 | Prosise et al. | |
| 2003/0131757 A1 | 7/2003 | Yang et al. | |
| 2008/0317932 A1 | 12/2008 | Long et al. | |

FOREIGN PATENT DOCUMENTS

| | | |
|---|---|---|
| EP | 0348196 A1 | 12/1989 |
| EP | 0586138 A2 | 3/1994 |
| WO | WO 03/056937 A1 | 7/2003 |

OTHER PUBLICATIONS

Cascadian Farm, "*Cascadian Farms Organic Granola Bar, Chocolate Chip*, 6-Count Boxes (Pack of 6),", http://www.amazon.com/Cascadian-Farms-Organic-Granola-Chocolate/dp/B000FGZKK4, Apr. 17, 2008.
Whole Foods, "Chocolate Chip Granola Bars," http://www.wholefoodsmarket.com/recipes/dessert/granolabars_chocolatechip.html, Apr. 17, 2008.
Cascadian Farm, *Dark Chocolate Almond Granola.*

* cited by examiner

*Primary Examiner* — Lien Tran
(74) *Attorney, Agent, or Firm* — Everett G. Diederiks, Jr.; Gregory P. Kaihoi

(57) ABSTRACT

Improved granola and granola products containing chocolate and their methods of preparation are provided. The methods include adding chilled chocolate containing dextrose to granola ingredients prior to the addition of a sugar binder formulated to perform as required at about 29-32° C. (85-90° F.) or colder. The methods include baking granola containing chocolate, cooling and packaging granola products such as breakfast cereals and granola bars. By using chilled chocolate and the sugar binder formulated for this method the problems of chocolate separation, smearing and off-flavors can be avoided in granola products containing chocolate.

19 Claims, 1 Drawing Sheet

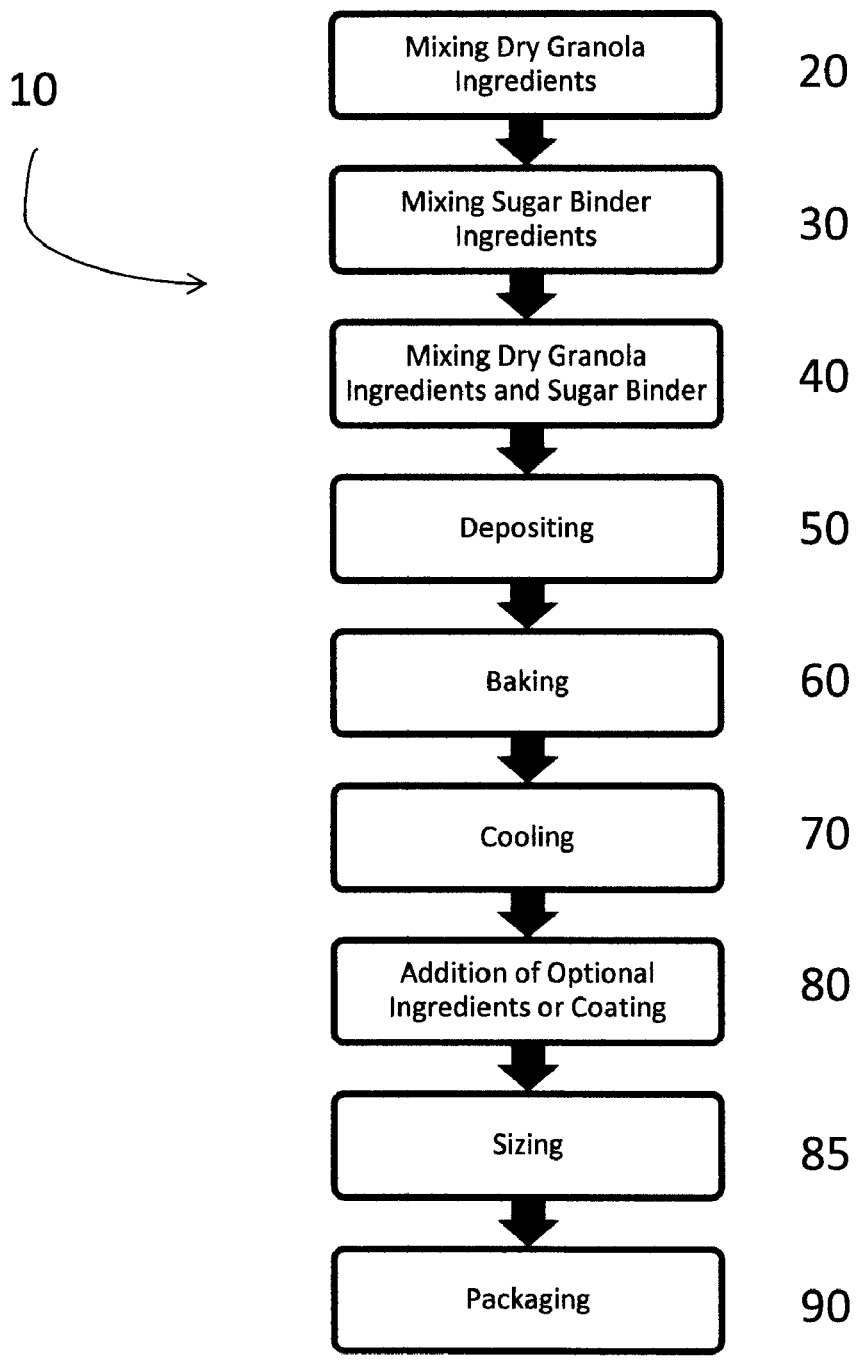

GRANOLA AND GRANOLA PRODUCTS CONTAINING CHOCOLATE AND METHODS OF PREPARATION

CROSS-REFERENCE TO RELATED APPLICATION

This application claims the benefit of priority under 35 U.S.C. 119(e)(1) of a provisional patent application, Ser. No. 61/146,043, filed Jan. 21, 2009, which is incorporated herein by reference in its entity.

FIELD OF THE INVENTION

The present invention is directed generally to food products and to their methods of preparation. In particular, the present invention is directed to improved granola and granola products containing chocolate and to processes for making.

BACKGROUND OF THE INVENTION

The present invention is an improvement upon granola and granola products and their method of preparation. More specifically, the present invention provides methods for preparing granola and granola products containing chocolate and to granola breakfast cereal products provided therefrom.

Granola and granola products are popular food items. Generally, traditional granola is a baked combination of dry particulate ingredients such as grains, nut meats, dried fruits and a sugar syrup binder. Upon baking, granola is a relatively shelf-stable food item. In addition to removing moisture from the sugar syrup binder, baking imparts a cooked or toasted flavor that can easily be distinguished from the unbaked granola ingredients. The sugar syrup binder, as the name implies, binds individual unbaked granola ingredients together creating an agglomerated semi continuous mass. Granola is often baked in sheets and cooled where it becomes semi solid and brittle easily broken or cut into desired sized pieces.

Since granola is shelf-stable and contains ingredients perceived as healthy, it has enjoyed lasting popularity as an ideal food to consume while camping or engaging in other outdoor activities. Granola used for this purpose is largely crumbly consisting of numerous irregular shaped pieces. As consumer demand for healthy foods and snacks has increased, companies that market and manufacture food products have found many additional uses and forms of granola.

Granola bars are one example of an additional use and form of granola. Traditional granola can be pressed into pans, baked and cut into bars. To introduce variety to granola bars, different combinations of dry particulate ingredients and flavors are added.

Granola breakfast cereals are one example of another use and form of granola. Traditional granola was consumed with milk as a morning meal. Breakfast cereal manufacturers have sought to improve the quality of granola as a breakfast cereal. To that end, cereal manufacturers blend granola with cereal puffs, shreds, flakes and other traditional cereal pieces. These combinations create interesting tasting and textured breakfast cereals. Other improvements have sought to create more uniform and typical breakfast cereal sized granola pieces or clusters. Granola cereals with more uniformly shaped pieces or clusters in addition to being more visually appealing have a more predictable bowl-life. Other improvements to granola products have sought to improve product textures to those that are crunchy but not excessively hard or compact into teeth upon consumption.

The perceived health benefits of granola have increased its popularity in recent years as individuals desire to increase their consumption of whole grains, fiber and fruit. Driven by this consumer demand, food manufacturers are increasing their efforts to create unique granola product offerings. One such variety of particular interest is granola containing chocolate. Chocolate provides a sweet and indulgent characteristic to granola and interestingly dark chocolate varieties are perceived as healthy by many consumers because they are known to contain antioxidants.

Adding chocolate to granola and granola products presents a unique set of challenges. Simply admixing chocolate pieces with finished prepared granola creates a heterogeneous mixture easily separated by gravity and or minor agitation. Such granola products are less desirable because the chocolate pieces migrate through the granola to the bottom of the mixing container, storage container or end user consumer packaging. Additionally, any exposure to temperatures above the melting point of the chocolate will cause the individual chocolate pieces accumulated in the bottom of the container to soften, melt and agglomerate. In addition to being visually unappealing a product experiencing such separation and agglomeration cannot be effectively remixing by the end consumer.

Others have sought to reduce this problem by combining chocolate pieces with still warm finished prepared granola. This method provides only a minor reduction in separation of chocolate from granola by gravity and minor agitation. Most chocolate pieces added in this manor do not sufficiently melt to adhere to the warm granola to remain permanently attached. Incorporating chocolate pieces to hot finished prepared granola sufficiently melts the chocolate pieces, but the mixing required to distribute the chocolate pieces throughout the granola creates a new problem, smearing. Smearing is the minor coating of granola ingredients caused by melted chocolate being removed from the surface of chocolate pieces and deposited onto the granola ingredients. In fact, severe examples of smearing produce chocolate coated granola products void of any chocolate pieces vs. granola containing intact chocolate pieces.

In another approach chocolate pieces are combined with grains and nuts prior the addition of a sugar binder. Addition of chocolate at this stage is also problematic. Often, the sugar binder used to prepare granola is added hot, above the melting point temperature of chocolate. Heat from the sugar binder both softens and melts the chocolate pieces. When combined with the mixing required to coat the granola ingredients with hot sugar binder, the chocolate smears throughout the granola. Baking the granola mixture in this state can lead to off flavors, reduced performance of the sugar binder and additional clean-up of product handling equipment. While this method is useful in producing granola containing chocolate, the end product can be visually unappealing and is less preferred by consumers.

Thus, the present invention is concerned with the problems of providing granola and granola products with chocolate pieces distributed throughout the product without separation of chocolate pieces from the granola or smearing in the finished product. Separation and smearing problems are avoided in the present invention by selecting chocolate pieces formulated to remain intact when elevated above the melting point temperature of chocolate. Surprisingly, it is possible to add chocolate pieces to the granola ingredients prior to the addition of a sugar binder in a method that starts with chilled chocolate pieces containing dextrose and use of a sugar binder formulated to perform as required at about 29-32° C. (85-90° F.) or colder. Surprisingly, by employing the combination of pre-chilled chocolate pieces contain dextrose, formulating an effective sugar syrup binder than can be used at low temperatures and using the particular sugar syrup at low application temperatures, a granola chocolate mixture of this invention can be mixed, baked, cooled and packaged yielding finished granola with chocolate distributed throughout the product without separation and smearing. The finished product also enjoys the traditional appearance, taste and texture of traditional granola notwithstanding the addition of chocolate.

BRIEF DESCRIPTION OF THE DRAWING

FIG. 1 is a process flow diagram and is an illustration of one embodiment of practicing the present invention.

BRIEF SUMMARY OF THE INVENTION

The present invention resides in methods for manufacturing granola and granola products containing chocolate which comprise the steps of:

A. mixing dry granola ingredients and chilled chocolate pieces containing dextrose;

B. mixing sugar binder ingredients to create a sugar binder syrup about 29-32° C. (85-90° F.) or cooler;

C. mixing the dry granola chocolate mixture with the sugar binder syrup;

D. depositing the granola chocolate sugar binder syrup mixture onto a surface;

E. baking the granola chocolate sugar binder syrup mixture;

F. cooling the baked granola chocolate sugar binder syrup mixture to form granola containing chocolate.

In its product aspect, the present invention resides in granola and granola products containing chocolate such as a breakfast cereal prepared by the present methods of preparation.

DETAILED DESCRIPTION OF THE INVENTION

The present invention provides an improvement upon granola and granola products and their methods of preparation. More specifically, the present invention provides methods for preparing granola containing chocolate and to improved granola products provided therefrom.

Throughout the specification and claims, percentages are by weight and temperatures in degrees Centigrade unless otherwise indicated. Each of the references patents and patent applications are incorporated herein by reference.

Referring now to FIG. 1, there is shown a process flow diagram generally designated by reference numeral 10. As illustrated in FIG. 1, the present methods can comprise a first step 20 of mixing dry granola ingredients to form a dry granola mix blend. Dry granola ingredients can include grains, nut meats, dried fruit and chocolate. Many combinations of relative amounts grains, nut meats and dried fruit are possible depending on the taste and texture of the end product desired. Grains because of their perceived health benefits and relatively low ingredient cost commonly comprise the majority of the granola mixture. Consumers also generally recognize and appreciate traditional granola as a product containing a majority constituent of grains. Grains selected for use in granola can include but is not limited to both more common grains (wheat, barley, oats, rye, corn, soy beans and rice) and specialty grains (sesame seeds, flax, millet, sorghum, buckwheat, quinoa, triticale, fonio, amaranth and teff) and combinations thereof. One skilled in the art can appreciate that grains in their native state can be hard or otherwise unsuitable for use in granola without pre-processing. Common pre-processing techniques include hulling, degerming, cracking, rolling, milling, roasting, cooking and drying, extrusion, flaking, puffing etc. and combinations thereof. Pre-processed grains are widely available and can be selected for the flavor, texture, nutrient or caloric content desired in the final granola product. In preferred variations, the granola contains a majority constituent of rolled oats, especially those that have been prepared by roll milling oat groats that have been heat treated for stability such as by steaming for enzyme inactivation. Also, consumer awareness of the health benefits of flax is increasing and in certain variations the granola products herein include a flax ingredient especially ground flaxseed.

Dry granola ingredients can include nut meats. Nut meats selected for use in granola includes but is not limited to (peanuts, pecans, walnuts, cashews, Brazil nuts, hazelnuts, pistachios, sunflower seeds, coconuts, pine nuts etc. and combinations thereof). One skilled in the art can appreciate that nut meats in their native state can be unsuitable for use in granola without pre-processing. Common pre-processing techniques include hulling, skinning, slicing, halving, quartering, splitting, chopping, shredding, drying, boiling and drying, roasting, salting, oil coating etc. and combinations thereof. Pre-processed nut meats are widely available and can be selected for the flavor, texture, nutrient or caloric content desired in the final granola product. Both whole nuts and nut pieces are contemplated for use herein.

Dry granola ingredients can include dried fruit. Dried fruits selected for use in granola includes but is not limited to (dates, figs, raisins, apples, pineapples, bananas, prunes, cranberries, cherries etc. and combinations thereof). One skilled in the art can appreciate that dried fruits in their native state can be less desirable for use in granola without pre-processing. Common pre-processing techniques include infusing, sugar coating, oil coating and treatment with ingredients to preserve the color, texture or freshness of the product etc. Dried fruits are widely available and can be selected for the flavor, texture, nutrient or caloric content desired in the final granola product. For example, the inulin infused fruit described in U.S. Pat. No. 7,118,772 "Inulin Infused Fruit and Method of Preparation" (issued Oct. 10, 2006 to Froseth et al.) finds particular suitability for use herein.

Dry granola ingredients can include chocolate as preferred herein. Chocolate selected for use in granola includes but is not limited to (dark chocolate, milk chocolate, semi-sweetened chocolate, bittersweet chocolate, sweet dark chocolate, white chocolate and combinations thereof). Chocolate sold in uniform pieces or chips or semi-uniform pieces or chunks is preferred for granola applications. One skilled in the art should have no difficulty sourcing chocolate for this application from a variety of domestic and International chocolate suppliers. The size of chip or chunk can selected for the flavor, texture, nutrient or caloric content desired in the final granola product.

Surprisingly, the selection of chocolate containing dextrose was found to be an essential element of this invention. In preferred variations chocolate found particularly useful as a granola ingredient is chocolate with a dextrose content of about 2%-6%, preferably about 3%-4%. Adding small amounts of dextrose provides structural stability to chocolate so that the chocolate pieces retain their shape when heated to temperatures above the melting point of chocolate (generally accepted as about 36° C.) unless acted upon by a physical force other than gravity (i.e. compression). Dextrose monohydrate is the most common form of dextrose used for this purpose because of its relatively low cost, availability and general acceptance for use in the formulation of foods.

In preferred embodiments, the dextrose containing chocolate pieces are chilled prior to admixture. Addition of chocolate to the granola mixture in the preferred method occurs after the chocolate is chilled to between about 0-19° C. (32-66° F.), preferably about 1.7 to 3.3° C. (35-38° F.). Depending on the overall ambient temperatures of the processing facility, chocolate pieces can be purposefully stored under refrigeration conditions until time of use.

Chocolate pieces or chunks are preferred in amounts of about 2%-25% of the dry granola ingredients, preferably about 4%-6%. In preferred variations the chocolate pieces range in size from a piece count ranging from about 200-2000 count per pound, preferably about 1000 count/lb. Importantly, the combination of use of chocolate pieces containing dextrose; chilling the chocolate pieces to a temperature ranging from about 1.7 to 3.3° C. (35-38° F.); and use of a temperate sugar binder (described later in step 30 herein) was found to maintain chocolate piece integrity during the mixing 40 and baking 60 steps that follow. In one preferred variation, the chocolate are in regular form and size, e.g., drops or kisses. In another variation, the pieces are of irregular shape and size, e.g., chunks or bits.

The granola can additionally comprise a variety of adjuvant materials intended to improve the taste, nutritional or visual appeal of the finished granola products herein. When of larger, more visually evident size, such added ingredients can be described as inclusions such as the nut pieces and/or fruit pieces described above. In other variations, the inclusions can include various candies, dried vegetable pieces, dried meat pieces, dried cheese pieces, soy protein pieces, and mixtures thereof. If present, such inclusions can collectively comprise about 1%-35% of the granola base.

A variety of optional ingredients can be added to the dry granola ingredients. Such optional ingredients can include flavors, colors, minerals, vitamins, preservatives, and fiber, oil, and mixtures thereof. Such adjuvant materials are typically added in fine or small particle size or as liquid additions. If present, such ingredients can comprise about 0.1 to 15% of the dry granola ingredients. Heat tolerant high potency sweeteners can be used (e.g., acetylsulfame K). However, heat sensitive high potency sweeteners (e.g., aspartame) should not be used exclusively since the rigorous high temperatures of the subsequent baking 60 step can cause degradation of these expensive high potency sweeteners. The vitamins selected should preferably be heat tolerant. A particularly useful combination of vitamins for topical application consist of vitamins C, A and D and mixtures thereof. If desired, the coated pieces can be topically applied with a separated spray of heat sensitive vitamins to minimize such vitamin loss to heat.

To increase the nutrition level of cereals above the base line provided by cereal ingredients, R-T-E cereals have long been nutritionally fortified with added micronutrients such as vitamins and certain trace elements and macronutrients such as minerals (e.g., calcium), soluble fiber, insoluble fiber, or soy protein. By micronutrients are meant materials added at levels of less than 1% (including any carriers or encapsulants). In contrast, macronutrients are materials added at levels of 1% or greater. These nutritionally fortifying ingredients have been blended together with the other dry ingredients. For heat sensitive materials such as certain heat sensitive vitamins that degrade during the cooking operation, these materials can be added later in the cereal preparation such as being topically applied to formed and dried pieces.

Another particularly useful ingredient is a fiber material. Both insoluble and/or soluble fiber ingredients are contemplated. Fiber ingredients can be added to increase the total amount of dietary fiber above the levels that are naturally provided with the principle grain ingredients, especially oat flour. In particular preferred embodiments, the granola mix includes or can be fortified with ingredients that can increase the level of soluble fiber. Especially useful herein are those sources of soluble fiber such as polydextrose, oat, bran, inulin (or other oligosaccharides), and mixtures thereof. To increase the level of insoluble fiber, bran ingredients from a variety of common bran sources can be employed especially those insoluble fiber ingredients from the brans from wheat, rice, barley and especially corn bran).

Still referring to FIG. 1, the present methods can comprise a second step 30 of providing a temperate at least 80° Brix sugar syrup binder. The temperate, i.e., warm or cool (but not hot) sugar syrup functions as a binder. Broadly, any sugar syrup at least 80° Brix type syrup can be used with the chocolate chips as long as the syrup is temperate in temperature, e.g., 30° C. (≦85° F.) degrees or cooler whereby the heat of the syrup does not warm the chocolate chilled chips sufficiently to cause their melting upon processing herein, preferably 20° C. or cooler. In one preferred form, the syrup ingredients can comprise:

about 40%-46% sugar;
about 15%-21% water;
about 12%-18% flour;
about 6%-12% syrup;
about 5%-11% oil;
about 2%-8% molasses;
about 0.5%-7% salt;
about 1% or less flavor;
about 0.05%-0.2% emulsifier.

The weight ratio of dry granola ingredients to sugar binder generally range from about 2:1 to about 1:2 (dry weight basis) preferably about 1.5:1 to about 1:1.5 and for best results about 1:1. The percentage of total dry granola ingredients to (liquid granola ingredients) or sugar binder ingredients in the preferred method is about 60% to 40% prior to baking.

Mixing sugar binder ingredients can be accomplished by any suitable mechanical or manual means. One skilled in the art can prefer to pre-mix the dry or granular ingredients separately prior to addition to a pre-mix of the liquid ingredients. In the preferred method, the final temperature of the sugar binder syrup should not exceed about 30° C. (85° F.) and the warm or cool sugar syrup is maintained at such temperatures until ready for blending with the granola base in the mixing step. Temperature can be controlled via jacketed mixing kettles, selection of a mixing method that minimizes friction imparted heating of the sugar binder ingredients or starting with chilled 1.7-3.3° C. (35-38° F.)water.

If desired, the syrup can additionally include a source of soluble fiber especially polydextrose and/or inulin whether or not such soluble fiber materials comprise ingredients of the granola dry mix. If present in the syrup, such soluble fiber source ingredients can comprise about 0.1-20% (solids basis of the syrup). Conveniently, such materials can be sourced in liquid form for ease or convenience in blending the syrup although solid form that is subsequently liquefied by water addition can also be used.

Sugar, particularly sucrose in dry granulated form is well suited for this application. One skilled in the art should have little difficulty obtaining commercially available sugar refined from sugar cane or sugar beet sources. In certain variations, the sugar can be less refined, e.g. brown sugar. Water, particularly potable municipal water is well suited for this application. No modifications to the mineral content or additional purification steps were found necessary. In order to maintain a mix temperature of 30° C. (85° F.) or cooler, chilled water 1.7-3.3° C. (35-38° F.) can be used or replacing a portion of the water with its equivalent liquid volume of ice can be desired.

Flour, selected from a variety of commercially available sources are suitable for use in this application. Such flours include but are not limited to; wheat, oat, corn, rye, barley, rice, buckwheat, tapioca, arrowroot, soy, garbanzo beans and combinations thereof. Depending on the desired taste and nutrient profile of the end product selected whole grain flours can also be selected.

Syrup, selected from a variety of commercially available sources are suitable for use in this application. Such syrups include but are not limited to; corn, maple, sugar cane, barley, tapioca, inulin etc. and combinations thereof. Honey is a suitable substitute for the various syrups mentioned above. Especially useful herein are grain syrup, e.g. barley syrup, oat syrup, wheat syrup, rice syrup and mixtures thereof.

Oil, selected from a variety of commercially available grain, vegetable and seed sources are suitable for use in this application. Such oils include but are not limited to corn, coconut, palm, sesame, soybean, canola, peanut, sunflower, olive, rice bran etc. and combinations thereof. In preferred form, the oils are substantially free of any trans fatty acids resulting from hardening or hydrogenation of liquid oils. In certain preferred forms all or a portion of the fat is provided by a natural solid fat such as coconut oil and palm oil.

Molasses, selected from commercially available sources are suitable for use in this application. Particularly well suited and widely available is molasses obtained from sugar cane or sugar beet sources. Selection of a particular variety of molasses should be done so for the desired color, flavor and nutrient content of the final granola product.

Salt, particularly sodium chloride or common salt in dry granulated form is well suited for this application. One skilled in the art should have little difficulty obtaining commercially available salt refined from seas or underground mines. In other variations, all or a portion of the common salt can be replaced with potassium chloride for sodium reduction.

Flavor(s), particularly dried ground spices and flavor extracts are suitable for use in this application. Spices and flavor extracts can be selected to enhance the overall flavor profile of the finished granola. Such flavors include but are not limited to; vanilla, cinnamon, nutmeg, cardamom, cloves, anise, lemon, orange, rose etc. and combinations thereof. One skilled in the art should have little difficulty obtaining commercially available dried ground spices and flavor extracts from domestic and International flavor suppliers. In still other variations, various culinary and/or medicinal herbs can be added for their taste and/or their known medicinal benefits.

Emulsifiers, selected from a variety of commercially available sources are suitable for use in this applications. Such emulsifiers include but are not limited to; brominated vegetable oil, lecithin, tripotassium phosphate, monoglyceride and diacetyl tartaric acid esters of monoglycerids etc. One skilled in the art should have little difficulty obtaining commercially available emulsifiers.

While conventional sourced materials are the principle intended use of the present invention, purposeful selection of ingredients certified as to be of organic origin and applied according to the methods described herein would yield an organic end product and such organic products are specifically contemplated herein.

Again, referring to FIG. 1, the present methods can comprise a third step 40 of mixing the dry granola ingredients importantly containing the chilled chocolate pieces and the warm (but not hot) or cool sugar syrup binder to form a wet deformable unbaked granola mass. Any commercially available mixer can be used for mixing dry granola ingredients and sugar binder. The mixer selected should thoroughly combine the dry granola ingredients and sugar binder to form an unbaked prepared granola mixture while minimizing damage done to individual component pieces. Depending on the batch size it is entirely possible to perform this step manually.

The present methods can comprise a fourth step 50 of depositing the unbaked prepared wet deformable granola mass or granola mixture onto a surface and forming the wet granola mass into a lose bed. In the preferred embodiment the surface is a continuous belt that conveys the unbaked granola mixture into an oven for the following baking step 60. Depositing 50 can be accomplished by a commercially available depositor or manually. In the preferred embodiment the product is deposited in a uniform depth of about 7.6-12.7 cm. (3-5 inches). One skilled in the art can appreciate that depositing 50 the product in a uniform manner will allow for more precise bake times and more consistent quality in the finished product. In a manual operation, unbaked granola mixture can be deposited on baking sheets alone or lined with baking parchment paper and spread to a uniform depth for baking 60. If the desired end products are granola bars, then included in the depositing 50 step can be a compressing sub-step to a uniform thickness and to form a slab or continuous ribbon of granola. Compression is easily accomplished through the use of smooth heavy rollers or smooth rollers applied with constant pressure to the unbaked prepared granola mixture after it is deposited.

The present methods can comprise a fifth step 60 of baking the unbaked prepared granola mixture in the form of a bed to form a baked dried granola. Unbaked prepared granola mixture is baked in the preferred embodiment at about 105-125° C. (220-255° F.) for about 15-30 minutes. In preferred embodiments, the baking step 60 is practiced immediately after the depositing step 50 so as to minimize the warming of the chilled chocolate pieces. Practicing the baking step 60 promptly minimizes the undesirable smearing of the chocolate whose avoidance is an object of the present invention. By "immediately thereafter" is meant while the chocolate pieces are cooler than the average temperature of the wet mass. Good results are obtained when the time interval between depositing and the baking step is less than 10 minutes, preferably less than five minutes and for best results less than one minute. The unbaked prepared granola mixture in the preferred embodiment typically enters the oven at 13%-19% moisture. In preferred form, the wet mass has an average temperature of 30° C. or less. The desired final moisture of the baked prepared granola mixture is about 2.5%-4.5%. Baking 60 can be practiced in any commercial or noncommercial oven depending on batch size capable of maintaining the required temperature for the required time. Commercial ovens include band or continuous conveyor ovens such as those manufactured and distributed by Proctor & Schwartz, Werner Lahara and Spooner. A typical commercial oven will have multiple zones; a first zone to rapidly heat the product, a second zone to remove moisture and bake the product developing color and flavor and third zone to remove additional product moisture. An advantage or feature of the present invention is that the baked granola product prepared from this baking operation has discrete chocolate pieces intermixed or dispersed there through and substantially lacking a smeared chocolate.

The present methods can comprise a sixth step 70 of cooling the baked dried granola to form a cooled baked and dried granola. Cooling 70 can occur by purposefully conveying baked prepared granola through a cooling tunnel or allowing the product to remain at rest in an ambient environment of less than 21° C. for an extended period of time. One skilled in the art will have little difficulty selecting a method of cooling 70 the baked granola.

The present methods can comprise a seventh step 80 of optionally adding adjuvant inclusion ingredients and/or coatings to the cooled baked and dried granola. In preparing a granola product blend addition of ingredients or coatings 80 can be practiced to extend the product offering. For example, in preparing a granola breakfast cereal containing chocolate, baked prepared granola exiting the cooling step 70 can be admixed with cereal flakes or other breakfast cereal pieces not contained within the baked granola. In another example, in preparing a yogurt coated granola containing chocolate, the baked prepared granola exiting the cooling step 70 can be coated with one or more coatings such as a yogurt compound coating, e.g., a topical coating. One skilled in the art will appreciate that there are numerous options for commercially available equipment to meter optional ingredients onto baked granola. Likewise, there are numerous options for commercially available equipment to apply coatings onto baked granola. Depending on the batch size, addition of optional ingredients and coating 80 could be performed manually. In certain variations, the coatings can be applied to one surface, e.g., a bottom or top layer. In still other variations, the pieces can be completely enrobed in a coating such as a supplemental chocolate coating.

The baked and dried granola can be formed and the present invention can include a sizing step 85. In one variation, the granola is formed into smaller pieces to form a dry free flowing particulate form. Such a particulate form finds particular suitability for use as a ready-to-eat breakfast cereal or an ingredient in other food applications. In other variations, the sizing step can include one or more cutting sub-steps to form the baked granola bed into suitably sized and shaped individual pieces. For example such sizing can be practiced to provide familiar granola bars of various sizes and portions, e.g., 25-50 g.

The finished baked and dried granola so prepared exhibits minimal smearing of the chocolate ingredient pieces. Chocolate pieces in the finished baked and dried granola are also uniformly distributed or intermixed throughout the product. Granola and granola products containing chocolate prepared according to the methods described herein remain in a heterogeneous mixture and rarely separate from the granola. The chocolate pieces largely remain intact and have an appearance best described as "baked in" reminiscent of chocolate chip cookies (chocolate chips permanently suspended in baked cookie dough).

The present invention can include a packaging step 90. The finished prepared granola products containing chocolate can be packaged in conventional food packages or containers and distributed in conventional form. One popular form especially suitable for a breakfast cereal is of a paperboard rectangular carton having an inner sealed bag fabricated from a flexible packaging film within which the present granola containing chocolate in the form of a breakfast cereal is disposed. Simple sealed bags or pouches (e.g., single serve portion sizes) are also contemplated. If the final product desired is in the form of granola bars the packaging step 90 will also include cutting the compressed baked prepared granola into bars prior to sealing one or more bars or pieces in individual packages or pouches.

The invention claimed is:

1. A method for manufacturing granola and granola products containing chocolate, comprising the steps of:
    mixing dry granola ingredients and chilled chocolate pieces containing dextrose to form a dry granola mix blend;
    providing a temperate sugar syrup binder that is at least 80° Brix and a temperature of 30° C. or less;
    mixing the dry granola mix blend and temperate sugar syrup binder to form a wet deformable granola mass;
    forming the wet deformable granola mass into a bed;
    baking the wet deformable granola mass in the form of the bed to form a baked dried granola;
    cooling the baked dried granola to form a cooled baked and dried granola having discrete chocolate pieces intermixed; and,
    sizing the baked dried granola to form sized portions of baked granola.

2. The method of claim 1, additionally comprising the step of: packaging the sized granola portions in a food packaging container.

3. The method of claim 1 wherein the weight ratio of syrup binder to granola base ranges from about 1:2 to about 2:1.

4. The method of claim of claim 3 wherein a majority portion of the granola base is provided by rolled oats and wherein the chilled chocolate pieces are chilled to a temperature ranging from about 0-15° C. before the mixing step.

5. The method of claim 1 wherein the forming step is practiced to form a loose bed.

6. The method of claim 1 wherein the sizing step is practiced to form a free flowing de-lumped loose particulate blend.

7. The method of claim 5 wherein the forming step is practiced to form a compressed bed.

8. The method of claim 6 wherein the sizing step is practiced to form individual granola bar pieces.

9. The method of claim 1 wherein the chocolate pieces are of a size that yields 200-1000 pieces per pound of chocolate.

10. The method of claim 1 wherein the bed has a thickness of 3-5 inches.

11. The method of claim 1 wherein the baking step is performed immediately after the forming step to minimize warming of the chilled chocolate pieces.

12. A method for manufacturing granola and granola products containing chocolate, comprising the steps of:
    mixing dry granola ingredients and chilled chocolate pieces containing dextrose to form a dry granola mix blend;
    providing a temperate sugar syrup binder that is at least 80° Brix;
    mixing the dry granola mix blend and temperate sugar syrup binder to form a wet deformable granola mass;
    forming the wet deformable granola mass into a bed;
    baking the wet deformable granola mass in the form of the bed to form a baked dried granola, wherein the baking step is practiced at a temperature of about 105-125° C.;
    cooling the baked dried granola to form a cooled baked and dried granola having discrete chocolate pieces intermixed; and,
    sizing the baked dried granola to form sized portions of baked granola and wherein the baked granola has a moisture content of 5% or less.

13. The method of claim 12 wherein the syrup has a temperature of 30° C. or less.

14. The method of claim 12 wherein the baked granola additionally comprises an added soluble fiber ingredient.

15. The method of claim 14 wherein at least a portion of the added soluble fiber ingredient is added as part of the sugar syrup.

16. The method of claim 15 wherein the chocolate pieces are irregular in shape.

17. The method of claim 16 wherein the baking step is practiced such that the chocolate pieces are heated to less than their melting point.

18. The method of claim 12 wherein the baking step is performed immediately after the forming step to minimize warming of the chilled chocolate pieces.

19. The method of claim 12 wherein the baked granola has a moisture content of 5% or less.

* * * * *